Aug. 25, 1925.

C. H. SMOOT 1,551,272

CENTRALIZED REGULATION

Filed Nov. 8, 1923

WITNESSES
Oliver W. Holmes

INVENTOR
Charles H. Smoot
BY
Knight Bro.
ATTORNEYS

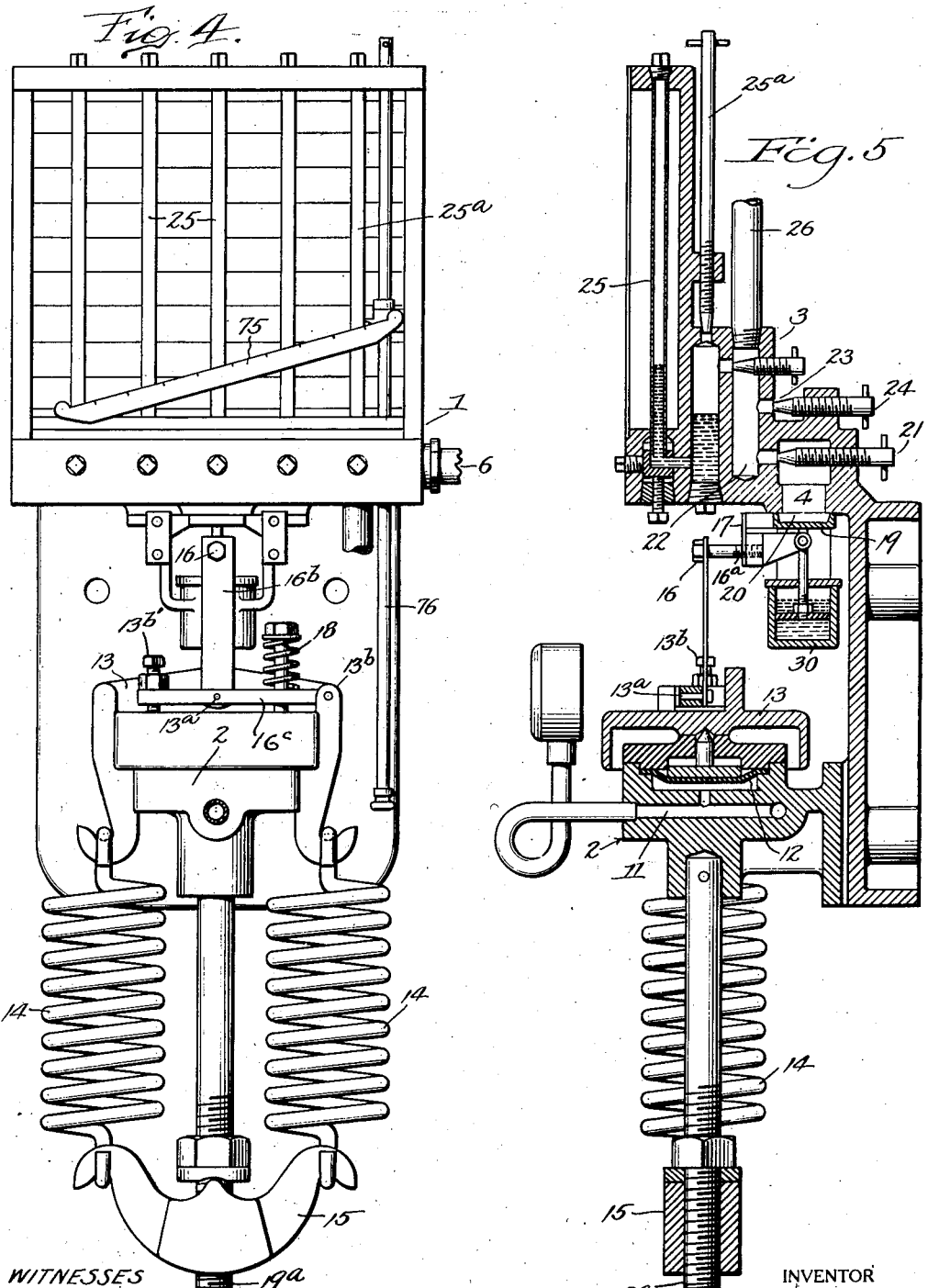

Patented Aug. 25, 1925.

1,551,272

UNITED STATES PATENT OFFICE.

CHARLES H. SMOOT, OF MAPLEWOOD, NEW JERSEY.

CENTRALIZED REGULATION.

Application filed November 8, 1923. Serial No. 673,531.

REISSUED

*To all whom it may concern:*

Be it known that I, CHARLES H. SMOOT, a citizen of the United States, residing in Maplewood, county of Essex, and State of New Jersey, have invented certain new and useful Improvements in Centralized Regulation, of which the following is a specification.

This invention has to do with plants where a plurality of variable elements affecting the output require regulation not only of the aggregate of the output but also as to the various proportions of the entities involved therein.

The invention comprises a master regulator and a method of control for controlling from a distance or from a central point or station not only the total of the variable elements independently of the ratios between the elements but also the proportions of the elements independently of the total.

There are many kinds of plants where it is necessary to keep up continuous control both of the amount and the proportions as for example, steam generating plants, blast furnaces, chemical factories and the like. It is customary in such plants to provide means for adjusting or controlling at least some and ofttimes all of the various elements entering into the product. I have found that great economy and increased general efficiency are obtainable by using means for bringing all the local controls to a central point and there with a master controller provide means to regulate not only the apportionment of the variables entering into the formation of the product but also means to regulate the total output without varying the apportionment.

More specifically my invention comprises means for connecting up the various controls having to do with the generation of steam in a number of boilers, to a master controller, by proper intermediate communicating ducts between the master controller and the local controls. The master controller is intended to automatically take charge of the generation of steam and hold in proper corelation all the elements having to do with such generation. It also is equipped with indicating devices whereby an operator at the master controller will have a visual oversight of the condition of every control and may at the master controller vary the ratio between the different elements influencing the steam generation. The operator may thus maintain a character of combustion to give the best boiler efficiency for all conditions of load. If this is obtained at 15% $CO_2$, then the master regulator is set for this value, and the control system supplies the proper amount of coal and air to the furnace for each boiler, to produce this condition. The system operates on a fixed variation in steam pressure between a maximum and a minimum value; for example, between 200 and 190 pounds.

The control equipment consists of one master controller designed to control any number of boilers; two auxiliary regulators for each boiler, to control the volume of air and draft; also an auxiliary regulator for each stoker and each forced-draft fan engine.

This apparatus is designed to supply a given amount of fuel and air to the boiler furnaces with each change of load on the boilers. If the load is increased, the steam pressure decreases. This decrease in pressure on the master controller causes the auxiliary regulator to speed up the stoker engine to feed the proper amount of coal to the boiler to care for the load. The speed of the forced-draft fan is increased and the position of the dampers adjusted automatically, so that the necessary volume of air is supplied to burn the increased volume of coal to a predetermined percent $CO_2$. If the load decreases on the boilers, the steam pressure increases. The effect of this increase in pressure is transmitted through the master controller to the auxiliary regulators and the volume of coal and air is decreased to meet the new condition. Various indicating devices on the master controller in direct communication with the individual controls or with the individual elements influencing the generation of steam give a comparative vision of the exact state of all the local conditions.

The invention further comprises details of the controlling apparatus as will appear from the following description and claims.

The invention will best be described with reference to the accompanying drawings, in which—

Figure 4 is a front elevation, and

Figure 5 is a transverse vertical section of the master controller.

Figure 1:
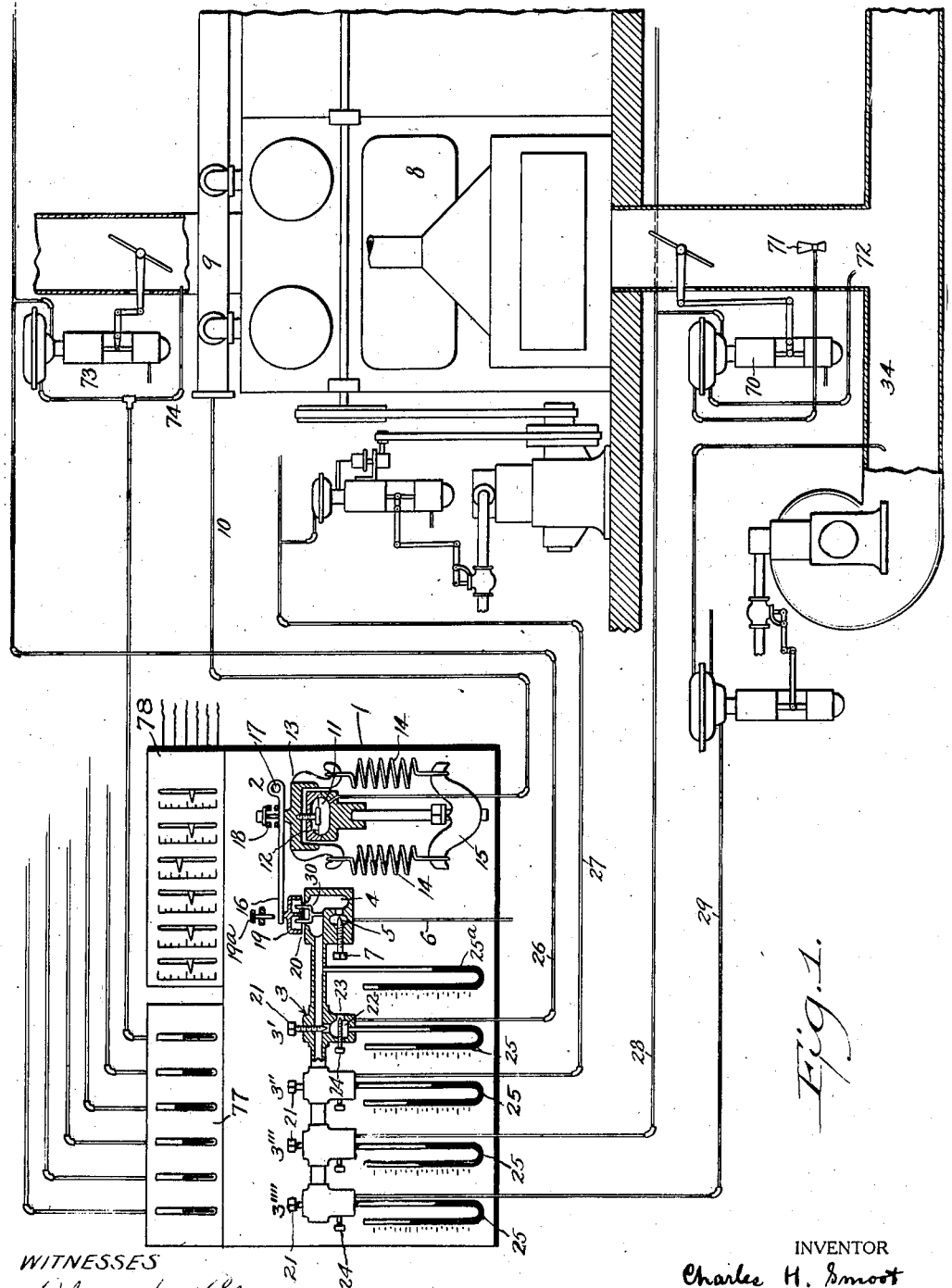
Figure 1 represents a master controller panel, showing the master controller in partial section and showing also the connection of the master controller with the local controls at the furnaces, only the end furnace of a battery or group of furnaces being indicated.

Referring to Figure 1, the master controller is shown at 1, and consists of a panel upon which is mounted a regulator 2, which is connected to the steam header and is responsive to the full pressure of the boiler. There is also mounted on the master controller a multiple air valve 3. One end of this air valve has a chamber 4 communicating through a restricted passage 5, with a source of compressed air represented by the pipe 6. The degree of restriction of the passage 5 may be adjusted by means of a screw valve 7. From the chamber 4, compressed air may escape in various ways. At 8, I show one of a series of boiler furnaces with a steam header 9, which is connected by pipe 10 to a chamber 11 in regulator 2, where the steam pressure operates against a diaphragm 12. Bearing down upon this diaphragm in a direction opposed to the steam pressure is a yoke 13, the force holding it down being supplied by springs 14, which in turn are supported by yoke 15 on the regulator. The yoke 13 operates against a lever 16, pivoted at 17, and held against the yoke by spring 18. The purpose of the spring 18, see Fig. 4, is to limit the maximum pull on the lever 16 in closing valve 19 on its seat. The leverage of 16 may be adjusted by threaded portion 16$^a$. In practice the lever 16 is connected by link 16$^b$ to a lever 16$^c$ at 13$^a$ which is pivoted to the yoke 13 at 13$^b$ and provided with a stop 13$^b$. The outer end of this lever 16 operates against a cup valve 19, which tends to restrict the escape of air from chamber 4 through opening 20. From the construction described, it will be obvious that as the steam pressure increases, forcing up the diaphragm 11, the cup valve 19 will be lifted further from its seat, allowing more air to escape from chamber 4, thus reducing the pressure in said chamber. It will be further obvious that the variations in chamber 4 will be proportional to the variations of steam pressure although in an inverse order, the air pressure decreasing as the steam pressure increases and vice versa. For example, while the steam pressure is decreasing from 200 to 190 pounds, the air pressure in chamber 4 may increase from practically zero to about two pounds. The air valve 3 is provided also with a series of other outlets as shown at 3′, 3″, 3‴, 3⁗, each one of which has a regulating screw 21, whereby the amount of air escaping past each valve may be nicely adjusted. The air in passing the adjusting valves 21, enters a chamber 22, from which it escapes to the atmosphere through orifice 23, controlled by an adjusting valve 24. Each one of the chambers 22 has a manometer or pressure gauge attached as shown at 25. From each chamber 22 a pipe leads to some one or other of the local controls. The pipe 26, for example, extends to all the controls regulating the flue damper. The pipe 27 extends to all the controls regulating the speed of the stoker engines. The pipe 28 extends to all the controls regulating the forced-draft dampers. The pipe 29 leads to all the controls of the forced-draft fans. If the load is increased on the boiler, the steam pressure decreases. This will allow diaphragm 12 and yoke 13 to drop a slight amount, this movement being very small. As the yoke 13 moves downward, the movement is transmitted to cup 19 and decreases the flow of air to atmosphere, causing the pressure in chamber 4 to build up and putting the regulator in a state of equilibrium again. This increase in air pressure in chamber 4 is transmitted to regulators on the stoker and forced-draft blower engines, by means of the conduits 27 and 29, causing them to speed up. This pressure is also transmitted to the regulators on the air and draft dampers, by means of pipes 26 and 28, and causes them to open an amount to supply the necessary air to burn the increased volume of coal supplied to the furnace. A small dash pot 30 under cup 19, prevents it from chattering. Although I have shown the choke valve 19 as controlled by the steam pressure it is obvious that it may be controlled by hand as for example by a screw 19$^a$.

I will now describe my preferred means for local control of the various functions in a boiler furnace. These controls are all built on the same general lines as shown in Figures 2 and 3, the former being a control for regulating the speed of the forced-draft engine and the latter a control for regulating the speed of the stoker engine.

Figure 2:
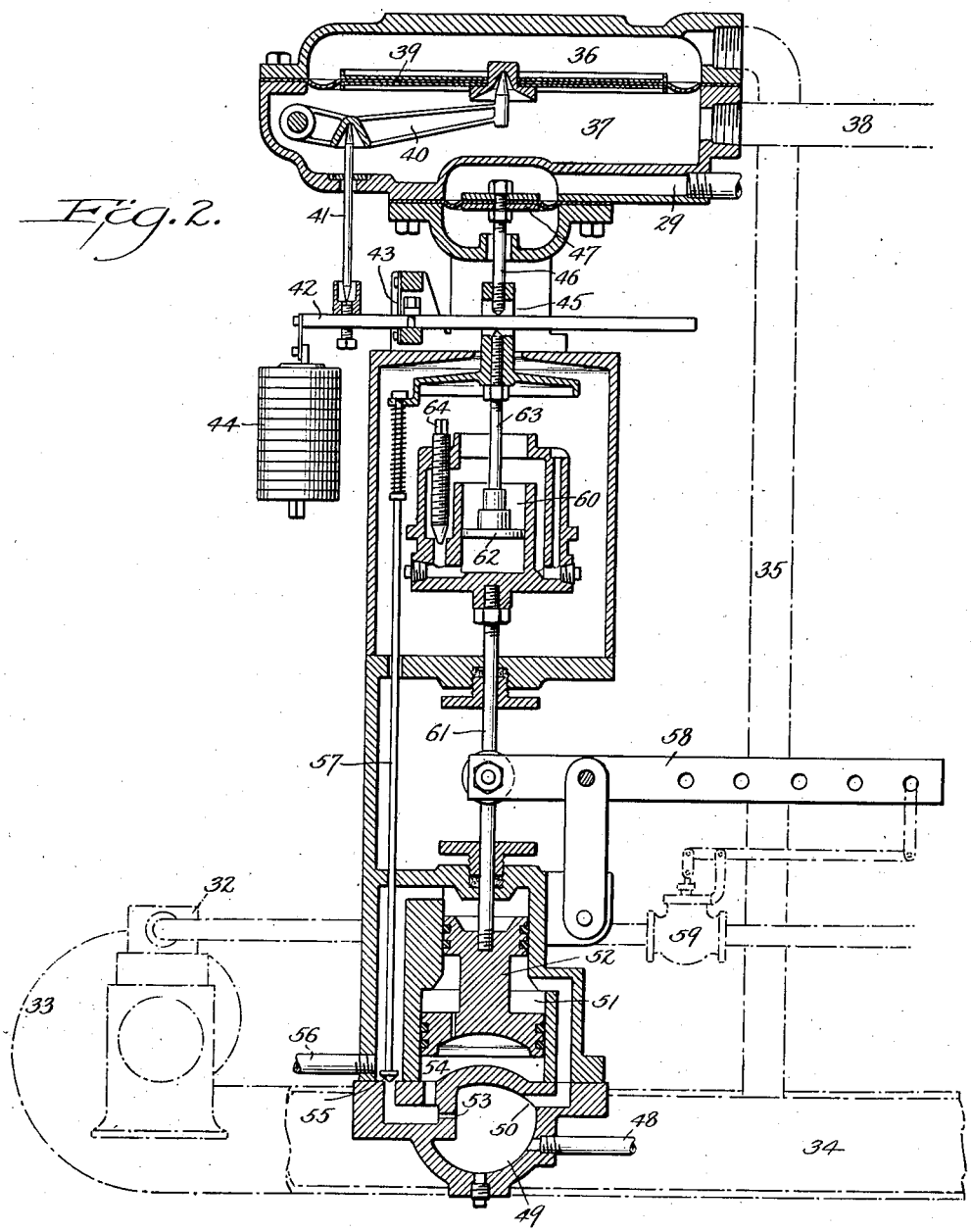
Figure 2 is a vertical section of the local control governing the forced-draft fan.

Referring to Figure 2, 32 may represent an engine, driving a blower 33, delivering air through duct 34 to a set of furnaces. From this duct, a by-pass 35 communicates with the upper half 36 of a diaphragm chamber, the lower half 37 of which opens to the atmosphere through pipe 38. The diaphragm 39 will, therefore, be responsive to pressure of air delivered by the blower and will, through lever 40, bring pressure to bear through stem 41 on the lever 42. This lever is pivoted by means of a flexible strip of metal at 43 and carries a weight 44 at its outer end, while at 45 it articulates with a vertical reciprocating rod 46, communicating with the diaphragm 47, exposed on one side to atmospheric pressure and on the other side to pressure from one of the control valves of the master controller through pipe 29. Steam at boiler pressure is admitted at 48 to chamber 49 at the bottom of the regulator and passes through the passage 50 to chamber 51 above piston 52, having two parts, the lower one being larger than the upper one. Steam also passes through the throttling orifice 53 and up into the chamber 54 on the under side of the larger piston. The pressure in chamber 54 is controlled by the position of valve 55 which allows steam to leak to atmosphere through pipe 56. The steam pressure on piston 52, in conjunction with the other forces acting on the regulator, puts the whole system in balance for any given condition. Assume in Figure 2 that an increase in load takes place on the boiler. This increase in load causes the pressure above the loading diaphragm 47 on the master controller to increase and cause it to move downward. The downward movement of this diaphragm is transmitted to valve 55 through valve stem 57. As valve 55 closes, it causes the pressure in chamber 54 to increase and give piston 52 an upward motion, which will move a lever 58, connected with the throttle valve 59 of the blower engine, in such a direction as to open the same and admit more steam, and thus increase the speed of the blower. The motion of the piston 52 upward and the downward motion of the diaphragm 47 are taken care of in dash pot 60. This dash pot prevents any sudden change in the motion of the various parts and any tendency for the regulator to hunt. The dash pot 60 is connected by stem 61 to the piston 52 and the lever 58 and the piston of the dash pot 62 is connected by rod 63 to the lever 42. An adjusting screw 64 may be used to regulate a restricted orifice from the dash pot to adjust the amount of its retarding effect.

When loading diaphragm 47 was moved downward, it caused the left hand end of lever 42, which is supported pivotally at 43, to move upward. This upward motion of lever 42 is transmitted to diaphragm 39 through lever 40. When the blower speeds up, the pressure is increased in the air duct, and this pressure is transmitted to diaphragm 39 and causes diaphragm 39 to tend to move downward and overcome the upward thrust of lever 40 and again put the regulator in a state of balance. The parts of the regulator are so proportioned that every definite change in pressure on the loading diaphragm 47 corresponding to a definite change in load on the boiler, causes a definite change in air pressure in the forced-draft duct. This change in air pressure, when transmitted to diaphragm 39, puts the regulator in balance, after conditions have been adjusted to care for the load on the boiler.

Figure 3:
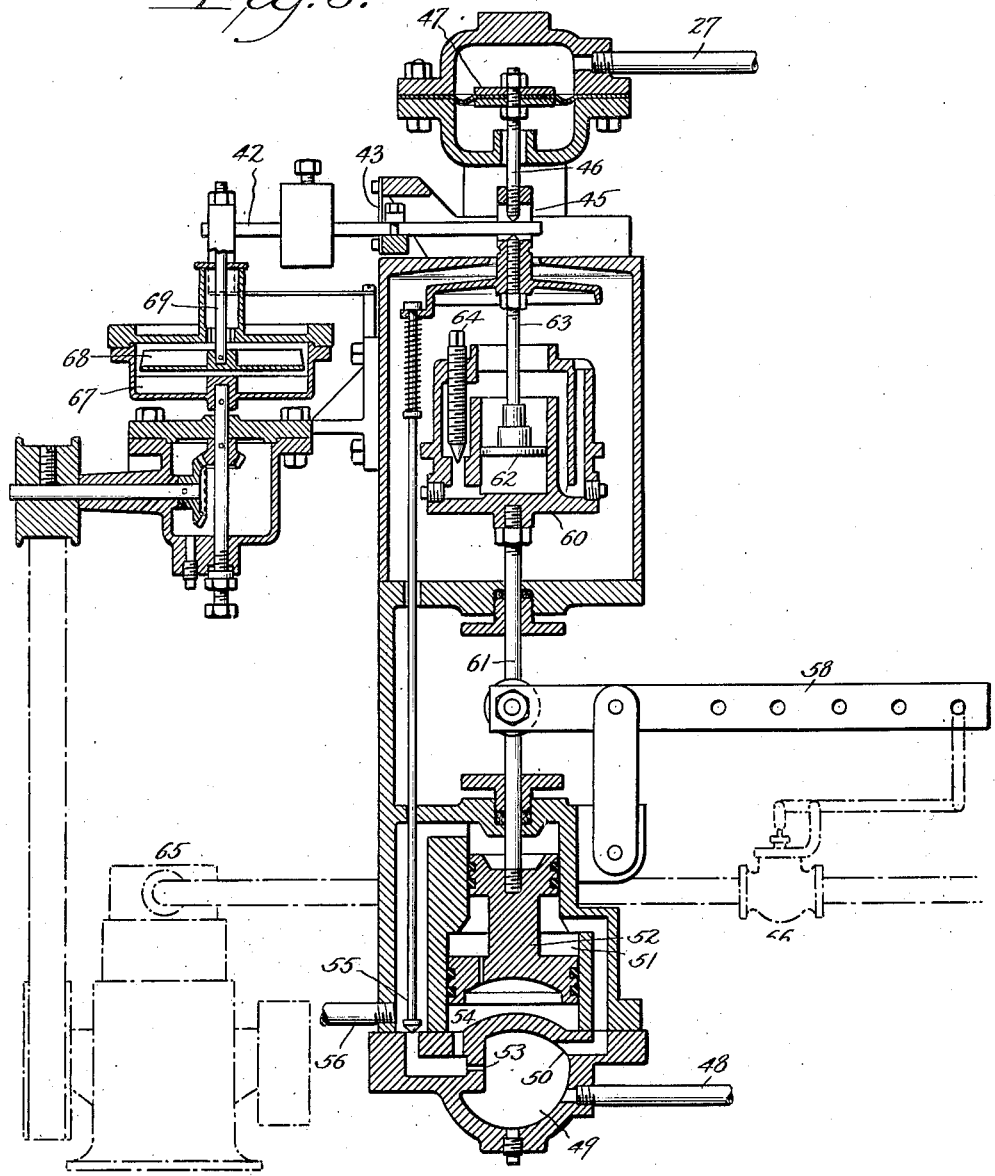
Figure 3 is a vertical section of the local control governing the stoker engine and fuel feed.

Referring to Figure 3, a stoker engine indicated at 65 has its speed controlled by a throttle 66 which in turn is under control of lever 58, piston 52, dash pot 60, by-pass valve 55, and other elements similar to those used for the control of the blower engine. On the stoker engine an oil-type governor is used in place of the flyball type. An oil container 67 is connected to the engine shaft through gears and a belt. In this container is a disk 68 with radial veins on its top surface. This disk is connected to the regulator and is held stationary, by means of a stem 69. When the air pressure is increased on diaphragm 47 through air pressure coming through pipe 27 from the master controller in response to a decrease in boiler pressure, the stoker engine is caused to speed up, and the left hand end of arm 42 starts to move upward. When the engine speeds up, the speed of the oil container on the governor is increased, and oil is caused, by centrifugal force, to flow out from under disk 68. This causes a reduction of pressure under the stationary disk, which increaes the downward force on lever 42 to overcome the motion caused by the air pressure on diaphragm 47. The change in forces acting on diaphragm 47 and disk 68 again puts lever 42 and regulator in balance, when the stoker engine has reached a speed to supply an amount of coal to the furnace corresponding to the new load conditions on the boiler.

The volume regulator 70 of the stoker air duct (Figure 1) operates similarly to that on the forced-draft blower engine, as explained for Figure 2. If the load increases on the boiler, the air pressure from the master controller is increased on the loading diaphragm of the volume regulator and causes it to operate and open the damper. Opening the damper, in conjunction with the increased pressure produced by the fan, causes the air to have an increased velocity and changes the pressure differential between the Venturi tube 71 and the Pitot tube 72. This change in pressure acting on the control diaphragm puts the regulator in balance for the new load conditions. The balance is obtained at such a point that the correct amount of air will be supplied to the fuel to burn it to the percent $CO_2$ set on the master regulator.

The increased volume of coal and air to the furnace, to take care of the increased load, increases the volume of gases up the stack. If the stack damper was not changed, the draft balance over the fire would be disturbed. This is taken care of by the draft regulator 73 (Figure 1). When the load increases on the boiler, the master regulator increases the pressure on the loading diaphragm of the draft regulator and causes it to operate to open the damper and increase the draft. This changes the pressure in the boiler uptake, which pressure is communicated to the control diaphragm on the regulator through pipe 74 and puts the regulator in balance when the damper has taken a position to give balanced draft over the fire.

The speed of the stoker engine and the forced-draft blower bears a definite relation to the steam pressure, increasing as the pressure decreases and decreasing as the pressure increases. However, the air pressure under the stokers is maintained by the damper regulators at a value that will supply the volume of air to the fire corresponding to the stoker speed, and consequently the amount of the coal delivered to the furnace. As the thickness of the fire increases, the resistance to the passage of air increases, which will tend to slow up the air flow.

A slight slowing up of the air flow will reduce the difference of pressure between the Venturi tube 71 and the Pitot tube 72, which change, acting on the regulator, opens the damper an amount to maintain the flow of air practically constant. On the other hand, if a hole blows in the fire, the velocity of the air in the duct increases and produces an increased difference in pressure between the Venturi tube 71 and the Pitot tube 72, and causes the regulator to close the damper until the volume of air going to the fire will correspond to the stoker speed. What has been said regarding a hole in the fire also applies to a fire that burns thin. In this case the resistance to the flow of air is reduced, and its increased velocity causes the regulator to adjust the damper to allow the proper amount of air to the furnace.

Adjustment for the relation between draft, stoker speed, air volume and forced-draft-fan speed are made by adjusting the valves 3', 3'', 3''', 3'''' on the master controller. The air pressure on each regulator is indicated on the U-tubes 25 where the U-tube 25$^a$ is calibrated for boiler rating. The tubes marked 25 may also be calibrated to indicate the quantities which they represent; namely, stack draft, stoker speed, air volume, blower pressure. They constitute an indicator that shows at a glance the relation existing between the various controls and consequently the condition of the different groups of variables and they therefore enable the engineer to observe any departure from normalcy. The ratio of the variables, for example the ratio of the air volume to the stoker speed which is a measure of the $CO_2$ may be read directly by the use of a diagonal scale such as shown at 75, see Figure 4. The right hand end of this scale may be raised or lowered by rod 76 until its inclination corresponds to the relative heights of the two columns it is desired to compare when the proportionality may be read off from the scale. At 77 I have shown a comparison group indicator having its individual indicators connected by conduits with the individual members of any one group of the variables, in this case the stack flues, so as to indicate any abnormal condition of any stack pressure by a departure from alignment of the indicator thus involved. Similarly indicators such as shown at 78 may be grouped together on the master controller and may show by their alignment or their lack of alignment whether the temperatures existing in the stack flues or some other function of the group that should be uniform is normal or otherwise.

In the embodiment of my invention shown and described herein, I have indicated a fluid medium as a means of communication between the local and master controls and indicators. It will, however, be obvious to those familiar with the art herein involved that electricity may be made use of as such a medium of communication and I therefore use the word medium in its broadest sense.

It will be understood from the foregoing description, that I design to bring to a central point the control of all the elements having to do with the output of a plant, thus doing away with the personal factor of the individual operators that I have found militates so against the attainment of the highest efficiency. With the centralized control one skilled man may have general supervision for the whole plant and can instantly detect any departure from normal of any part thereof and instantly apply the proper means of correction. The individual attendants of the boilers can have no such general knowledge and cannot be trusted to do the right thing with regard to the plant as a whole. As an instance of the value of this centralization: suppose that a comparison indicator at the central controller station shows a reduction in the steam flow of one of the boilers from the average steam flow of all of the boilers. While the fuel feed shows uniformity, the forced draft shows, on the comparison indicator for forced draft, that the same boiler has an increase in the draft. This would indicate a hole in the fuel bed and instructions could be sent with the chief operator to have the fire corrected.

With the general and local controls working properly all the boilers will get the same input. The juxtaposed meters show the average or maximum output which can be obtained. Hence it will be apparent that with the input so held automatically uniform by the controller, any variation shown on any of the juxtaposed meters from the average of all the meters will indicate directly to the operator which boiler is at fault. Without the control insuring a uniform input, the deflection of any one meter from the average would mean nothing since the variation might be due to different inputs.

While I have described my invention with particular reference to steam generation, it is in its broader features applicable to any plant where a plurality of variables are to be controlled from a central point.

I claim:—

1. The method of detecting an inefficient fire in a plurality of interconnected boilers, which comprises automatically regulating the supply to each boiler of a fixed proportion of the total fuel, registering in juxtaposition at a central point the condition of such regulation, and registering in juxtaposition like functions indicating the output of the boilers so as to show any departure in the output of one boiler from the average output of all boilers.

2. The method of detecting an inefficient fire in a plurality of interconnected boilers, which comprises automatically regulating the supply to each boiler of a fixed proportion of the total air, registering in juxtaposition at a central point the condition of such regulation, and registering in juxtaposition like functions indicating the output of the boilers so as to show any departure in the output of one boiler from the average output of all boilers.

3. The method of detecting an inefficient fire in a plurality of interconnected boilers, which comprises automatically regulating the supply to each boiler of a fixed proportion of the total fuel and air, registering in juxtaposition at a central point the condition of such regulation, and registering in juxtaposition like functions indicating the output of the boilers so as to show any departure in the output of one boiler from the average output of all boilers.

4. The method of detecting an inefficient fire in a plurality of interconnected boilers, which comprises automatically regulating the supply to each boiler of a fixed proportion of the total fuel, registering in juxtaposition at a central point the condition of such regulation, and causing an intermediate medium to register in juxtaposition like functions influencing the performance of the boilers so as to indicate any departure in the output of one boiler from the average output of all boilers.

5. The method of detecting an inefficient fire in a plurality of interconnected boilers, which comprises automatically regulating the supply to each boiler of a fixed proportion of the total air, registering in juxtaposition at a central point the condition of such regulation, and causing an intermediate medium to register in juxtaposition like functions influencing the performance of the boilers so as to indicate any departure in the output of one boiler from the average output of all boilers.

6. The method of detecting an inefficient fire in a plurality of interconnected boilers, which comprises automatically regulating the supply to each boiler of a fixed proportion of the total fuel and air, registering in juxtaposition at a central point the condition of such regulation, and causing an intermediate medium to register in juxtaposition like functions influencing the performance of the boilers so as to indicate any departure in the output of one boiler from the average output of all boilers.

7. A master controller for steam boiler plants, comprising means for regulating the supply of fixed proportions of fuel to all the boilers, means for registering in juxtaposition the fuel supply to each boiler, and means for registering in juxtaposition like functions influencing the performance of the boilers so as to indicate any departure in the output of one boiler from the average output of all boilers.

8. A master controller for steam boiler plants, comprising means for regulating the supply of fixed proportions of air to all the boilers, means for registering in juxtaposition the air supply to each boiler, and means for registering in juxtaposition like functions influencing the performance of the boilers so as to indicate any departure in the output of one boiler from the average output of all boilers.

9. A master controller for steam boiler plants, comprising means for regulating the supply of fixed proportions of fuel and air to all the boilers, and means for registering in juxtaposition the fuel and air supply to each boiler, means for registering in juxtaposition like functions influencing the performance of the boilers so as to indicate any departure in the output of one boiler from the average output of all boilers.

10. In combination with a steam generating plant having a plurality of variable elements affecting the generation of steam, each of said elements having an individual local control, a master controller comprising means for regulating an auxiliary medium, a plurality of individual conduits connected with said regulating means, individual regulators on the master controller for controlling the flow of the auxiliary medium to said conduits, each of said conduits being connected to one of said local controls, and means at the master controller responsive to boiler pressure for controlling the flow of said auxiliary medium to said individual regulators.

11. In combination with a steam generating plant having a plurality of variable elements affecting the generation of steam, each of said elements having an individual local control, a master controller comprising means for regulating an auxiliary medium in multiplied ratio to the pressure of steam, a plurality of individual conduits connected with said regulating means, individual regulators on the master controller for controlling the flow of the auxiliary medium to said conduits, each of said conduits being connected to one of said local controls, and means at the master controller for controlling the flow of said auxiliary medium to said individual regulators.

12. A master controller for controlling from a central point the supply of fuel and air to boiler furnaces, comprising means responsive to boiler pressure, means varying proportionately with said pressure-responsive means for controlling independently the fuel feed, air pressure and air volume, and means on the master controller for regulating said variables independently and proportionately.

13. A master controller for power plants, comprising, a pressure chamber communicating with a source of fluid under constant pressure, means responsive to boiler pressure controlling the pressure in said chamber, a plurality of secondary chambers individually in communication with the fluid pressure chamber, local controls for the power plant, conduits connecting the local controls individually to the secondary chambers and individual means for adjusting the pressure in each of the secondary chambers.

14. A master controller for power plants comprising means responsive to boiler pressure, a source of constant fluid pressure, a fluid pressure chamber connected with said source through a restricted orifice, a relief valve controlling the leakage from said chamber, and adjustable means connecting the boiler responsive means with the relief valve, secondary chambers communicating with the fluid pressure chamber and means for controlling the flow from said fluid pressure chamber to the secondary chambers and from the secondary chambers to the atmosphere.

15. A master controller for power plants, comprising, a pressure chamber communicating with a source of fluid pressure, means responsive to boiler pressure controlling the pressure in said chamber, a plurality of secondary chambers individually in communication with the fluid pressure chamber, local controls for the power plant, conduits connecting the local controls individually to the secondary chambers, individual means for adjusting the pressure in each of the secondary chambers, and pressure gages registering the pressure in the individual chambers.

16. A master controller for power plants, comprising a pressure chamber communicating with a source of fluid pressure, means responsive to boiler pressure controlling the pressure in said chamber, a plurality of secondary chambers individually in communication with the fluid pressure chamber, local controls for the power plant, conduits connecting the local controls individually to the secondary chambers, juxtaposed pressure gages registering the pressure in the individual chambers and means for adjusting such pressures.

CHARLES H. SMOOT.